(12) United States Patent
Xu

(10) Patent No.: US 6,853,549 B2
(45) Date of Patent: Feb. 8, 2005

(54) MOUNTING APPARATUS FOR DATA STORAGE DEVICES

(75) Inventor: Ji-Guo Xu, Shenzhen (CN)

(73) Assignee: Hon Hai Precision Ind. Co., LTD, Taipei Hsien (TW)

( * ) Notice: Subject to any disclaimer, the term of this patent is extended or adjusted under 35 U.S.C. 154(b) by 137 days.

(21) Appl. No.: 10/390,135

(22) Filed: Mar. 14, 2003

(65) Prior Publication Data

US 2004/0179333 A1 Sep. 16, 2004

(51) Int. Cl.⁷ .............................................. G06F 1/16
(52) U.S. Cl. ............... 361/685; 312/223.2; 248/222.11; 211/26
(58) Field of Search ................... 361/683–686, 361/724–727; 439/352, 353; 211/26, 41, 94, 162; 248/222.11, 298.1, 222.4; 312/223.2, 319.1, 333

(56) References Cited

U.S. PATENT DOCUMENTS

| | | | | |
|---|---|---|---|---|
| 4,979,909 A | * | 12/1990 | Andrews | 211/26 |
| 5,301,088 A | | 4/1994 | Liu | |
| 6,297,954 B1 | * | 10/2001 | Seo | 361/686 |
| 6,396,686 B1 | * | 5/2002 | Liu et al. | 361/685 |
| 6,445,663 B1 | * | 9/2002 | Chen et al. | 361/685 |
| 6,590,775 B2 | * | 7/2003 | Chen | 361/725 |
| 6,667,880 B2 | * | 12/2003 | Liu et al. | 361/685 |
| 6,751,093 B1 | * | 6/2004 | Hsu et al. | 361/685 |
| 2004/0075978 A1 | * | 4/2004 | Chen et al. | 361/685 |

FOREIGN PATENT DOCUMENTS

TW 190919 5/1992

* cited by examiner

Primary Examiner—Lisa Lea-Edmonds
(74) Attorney, Agent, or Firm—Wei Te Chung

(57) ABSTRACT

A mounting apparatus includes a computer drive bracket (10), an operating body (20) attached to a lateral wall (12) of the drive bracket, a data storage device (30), and two slide members (40) attached to sides of the storage device. First and second holes (126, 123) are defined in the wall, and a stop plate (124) is formed from the wall. The operating body includes: a resilient tongue (28) having a first wedge (22); and a second wedge (27). The first and second wedges engage in the first and second holes respectively. One slide member includes a protrusion (49') and a buffer (47'). The protrusion snappingly engages with the first wedge so that it abuts the first wedge and prevents said slide member from moving back out from the drive bracket. The buffer abuts the stop plate and prevents the slide member from moving too far into the drive bracket.

22 Claims, 7 Drawing Sheets

MOUNTING APPARATUS FOR DATA STORAGE DEVICES

BACKGROUND OF THE INVENTION

1. Field of the Invention

The present invention relates generally to apparatuses for mounting computer components within a computer enclosure, and more particularly to a mounting apparatus for easily installing and removing data storage devices such as disk drives.

2. Related Art

A number of different means and devices are used to mount data storage devices, such as disk drives or CD-ROMs, to drive brackets of computer enclosures. One widely used conventional means is to simply screw the data storage device directly to a drive bracket. A significant drawback of this means is that the insertion and removal of screws is time consuming and cumbersome, particularly due to workspace restrictions and accessibility limitations existing within a typical computer chassis. More recent developments facilitate installation and removal of data storage devices by other means. These include the use of guide rail type devices, such as those described below.

Taiwan Patent Publication No. 190919 discloses a mounting apparatus employing sliding rails for mounting data storage devices. A pair of sliding slots is defined in opposite sides of a drive bracket respectively. A pair of sliding rails is attached to opposite sides of a data storage device respectively, corresponding to the sliding slots. However, the sliding rails are attached to the drive bracket with screws. Insertion and removal of the screws is still time consuming and cumbersome.

Taiwan Patent Publication No. 146513 discloses another kind of mounting apparatus that needs no tools when disassembled. A pair of slide members is attached to opposite sides of a data storage device. The front part of the slide member comprises a locking plate. A locking hole is defined in a drive bracket, the locking hole corresponding to the locking plate. The locking plate engages in the locking hole to secure the data storage device to the drive bracket. In disassembly, the locking plate is released, and the data storage device is slid out from the drive bracket. However, when the data storage device needs to be maintained or replaced, the slide members have to be unscrewed therefrom. This operation is time consuming and cumbersome.

SUMMARY OF THE INVENTION

Accordingly, an object of the present invention is to provide a mounting apparatus which readily allows attachment and removal of a data storage device to and from a drive bracket.

To achieve the above-mentioned object, a mounting apparatus in accordance with a preferred embodiment of the present invention is adapted to mount a data storage device in a computer enclosure. The mounting apparatus includes a drive bracket, an operating body, a data storage device, and a pair of slide members. The drive bracket includes two opposite lateral walls. A first hole and a second hole are defined in one of the lateral walls. A stop plate is inwardly formed from said one of the lateral walls, rearwardly of the holes. The operating body is secured to said one of the lateral walls of the drive bracket. The operating body includes a first wedge formed on a resilient tongue, and a second wedge. The first and second wedges engage in the first and second holes of said one lateral wall of the drive bracket respectively. The slide members are attached to opposite sides of the data storage device, and the data storage device is slid into the drive bracket. One of the slide members corresponding to said one lateral wall includes a protrusion and an end buffer. The protrusion snappingly engages with the first wedge so that it abuts the first wedge and prevents said one of the slide members from moving back out from the drive bracket. The buffer abuts the stop plate of said one lateral wall and prevents said one of the slide members from moving too far into the drive bracket.

Other objects, advantages and novel features of the present invention will be drawn from the following detailed description of the preferred embodiment of the present invention with the attached drawings, in which:

DESCRIPTION OF THE PREFERRED EMBODIMENT

Figure 1:
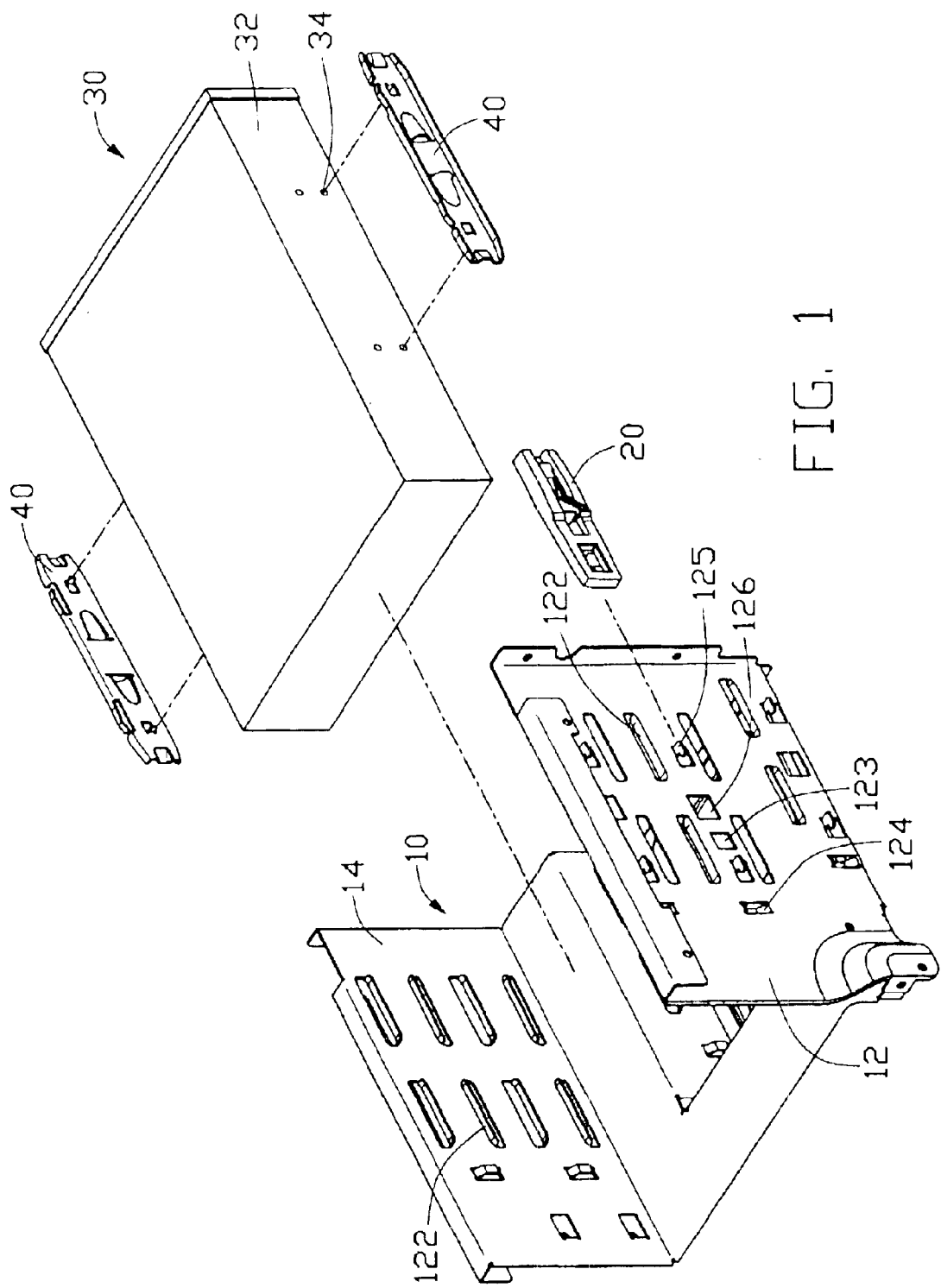
FIG. 1 is an exploded, isometric view of a mounting apparatus for a data storage device, in accordance with the preferred embodiment of the present invention.

Referring to FIG. 1, a mounting apparatus for data storage devices in accordance with a preferred embodiment of the present invention comprises a drive bracket 10, an operating body 20, a data storage device 30 and a pair of slide members 40.

The data storage device 30 comprises two opposite side walls 32. A plurality of locking holes 34 is defined in each side wall 32.

The drive bracket 10 comprises two opposite upright lateral walls 12, 14. The lateral wall 12 defines a first hole 126 in a center thereof, and a second hole 123 rearwardly of the first hole 126. Two horizontal generally L-shaped hooks 125 are stamped outwardly from the lateral wall 12 at opposite sides of the first and second holes 126, 123 respectively, such that the hooks 125 and the first and second holes 126, 123 are horizontally aligned. A stop plate 124 is stamped inwardly from the lateral wall 12, rearwardly of the hooks 125. A pair of aligned support tabs 122 is stamped perpendicularly inwardly from the lateral wall 12 above the hooks 125. Another pair of aligned support tabs 122 is stamped perpendicularly inwardly from the lateral wall 12 below the hooks 125. Two pairs of support tabs 122 are stamped perpendicularly inwardly from the lateral wall 14, corresponding to the support tabs 122 of the lateral wall 12. The support tabs 122 of the lateral wall 12 cooperatively form a guide rail. The support tabs 122 of the lateral wall 14 cooperatively form another guide rail, corresponding to the guide rail of the lateral wall 12. The guide rails of the lateral walls 12, 14 cooperate to slidably accommodate the data storage device 30 therebetween.

Figure 2:
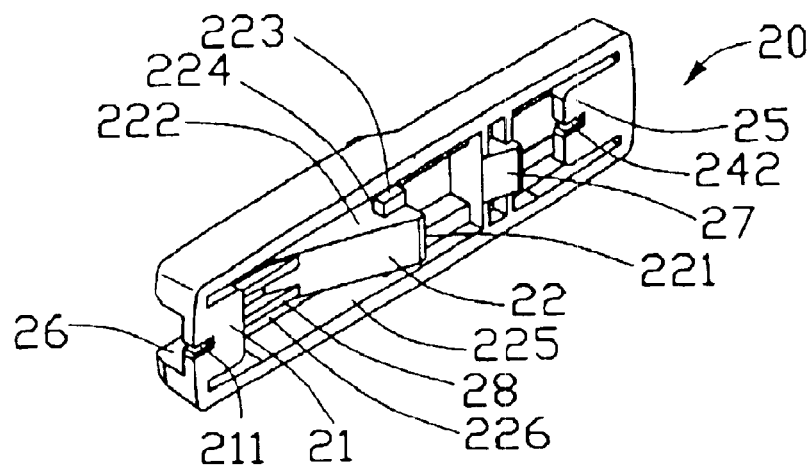
FIG. 2 is an enlarged, isometric view of an operating body of the mounting apparatus of FIG. 1, but viewed from another aspect.
Figure 3:
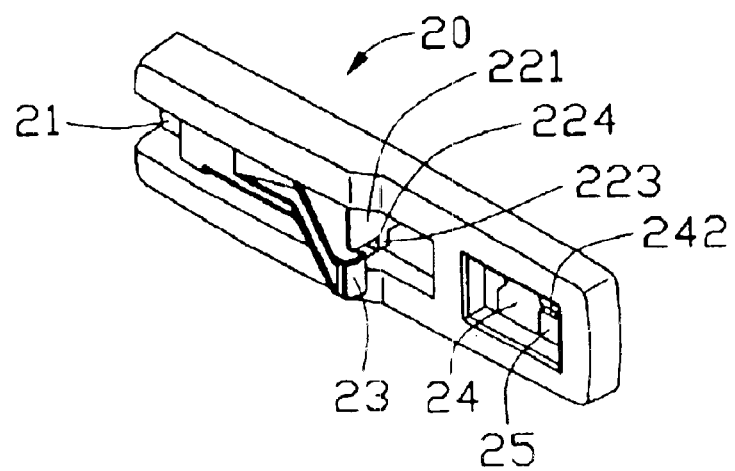
FIG. 3 is similar to FIG. 2, but viewed from still another aspect.

Referring to FIGS. 2–3, the operating body 20 is generally elongate, and is installed on an outside of the lateral wall 12. The operating body 20 comprises a main outer board 226, a pair of opposite longitudinal side boards 225 perpendicularly adjoining the main outer board 226, and first and second base boards 25, 21 interconnecting the side boards 225 at opposite ends of the operating body 20 respectively. The operating body 20 defines an opening 24 in one end above the first base board 25. A recess 26 is defined in the operating body 20 at the other end above the second base board 21. The first base board 25 defines a first slot 242 in communication with the opening 24. The first slot 242 corresponds to one of the hooks 125 of the lateral wall 12 of the drive bracket 10. The second base board 21 defines a second slot 211 in a free end thereof, in communication with the recess 26. The second slot 211 corresponds to the other hook 125 of the lateral wall 12. The operating body 20 further comprises a resilient tongue 28 extending from the main outer board 226 near the second base board 21. A free end of the tongue 28 extends inwardly to form a first wedge 22, and outwardly to form a handle 23. The first wedge 22 is for engaging in the first hole 126 of the lateral wall 12 of the drive bracket 10. The first wedge 22 comprises a distal first contact face 221, and a pair of opposite lateral faces 222. A pair of stop blocks 223 extends perpendicularly from distal ends of the lateral faces 222 respectively. Each stop block 223 comprises a second contact face 224 generally opposing the main outer board 226. The operating body 20 further comprises a second wedge 27 extending inwardly away from the main outer board 226, and being disposed adjacent the opening 24 across from the first base board 25. The second wedge 27 is for engaging in the second hole 123 of the lateral wall 12 of the drive bracket 10.

Figure 4:
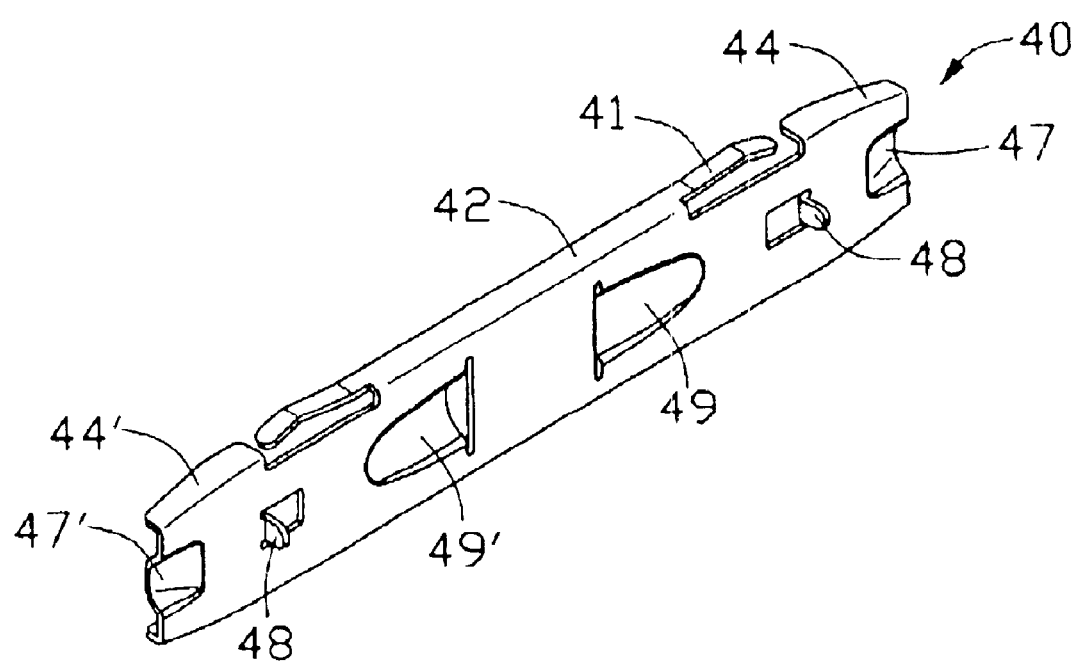
FIG. 4 is an enlarged view of one slide member of the mounting apparatus of FIG. 1.
Figure 5:
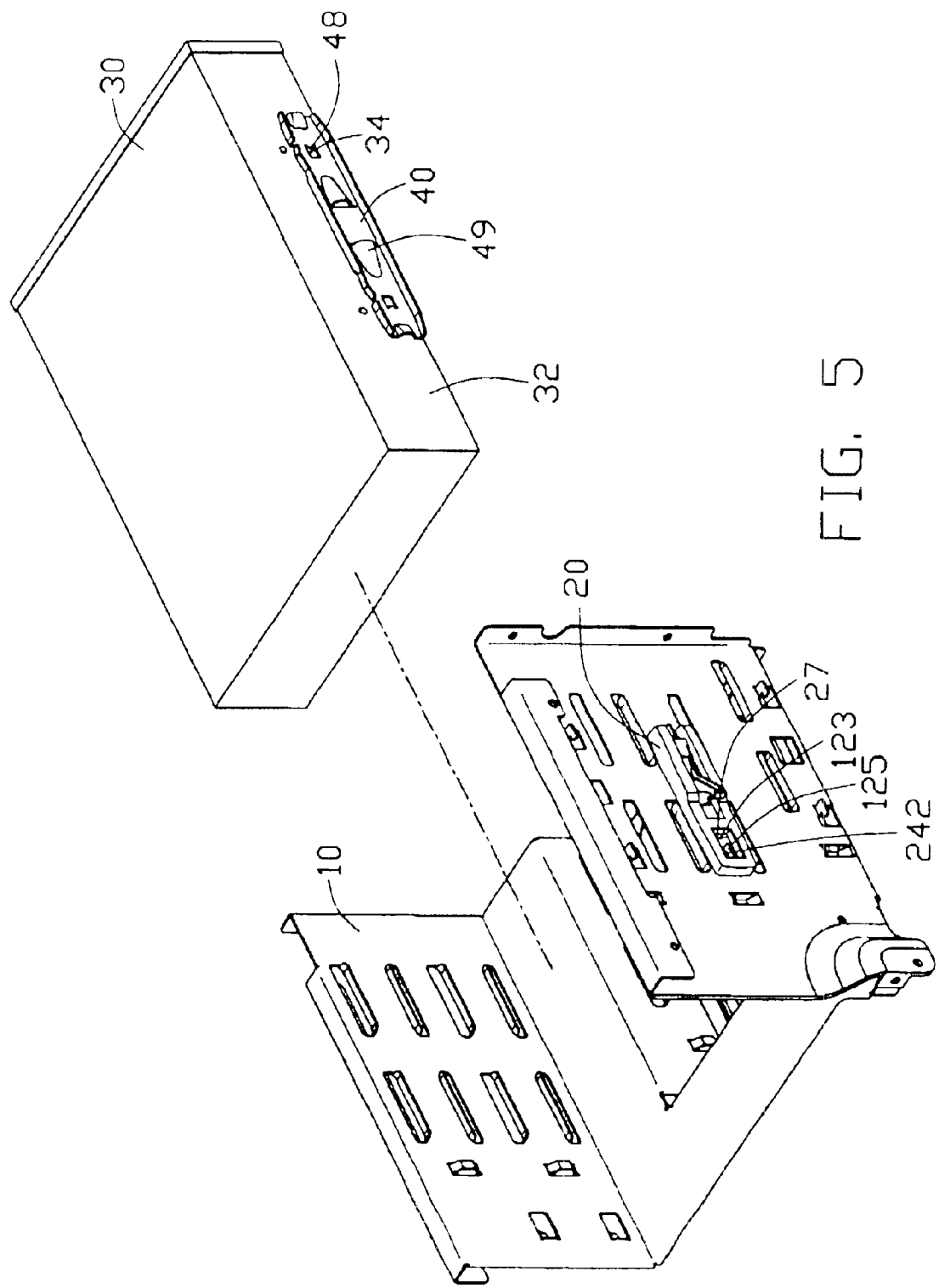
FIG. 5 is a partly assembled view of FIG. 1.
Figure 6:
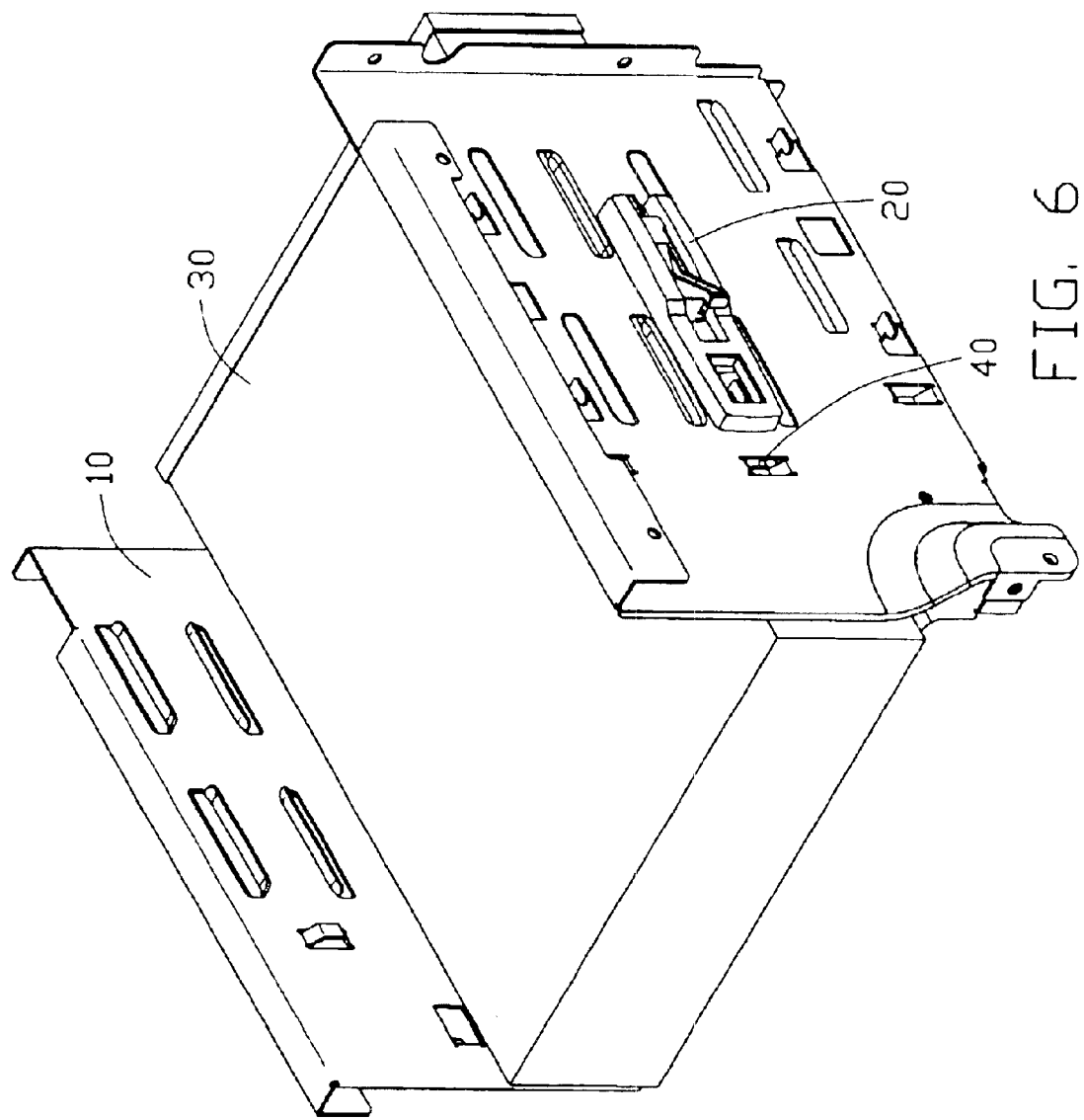
FIG. 6 is a fully assembled view of FIG. 1.
Figure 7:
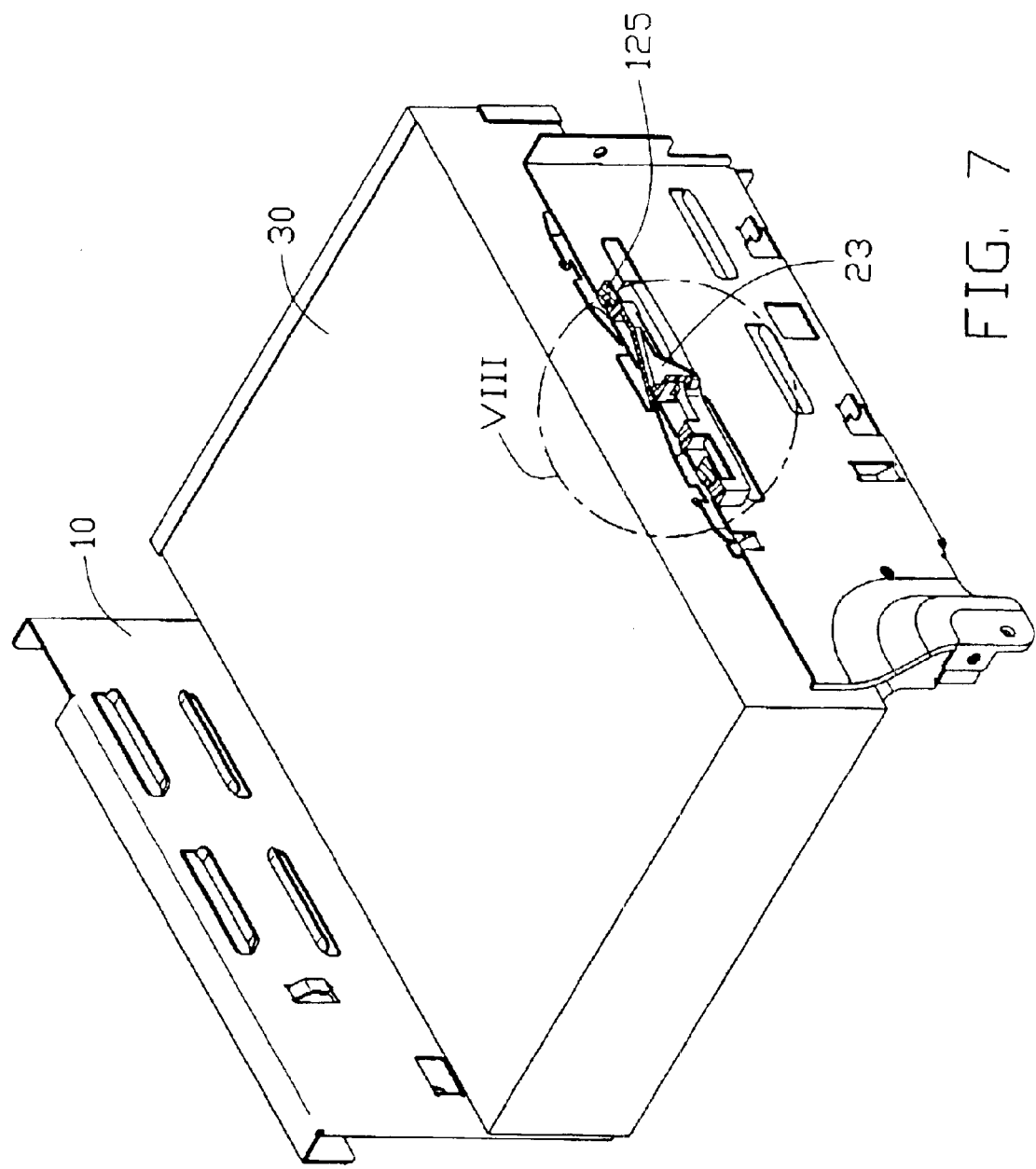
FIG. 7 is similar to FIG. 6, but with part of a drive bracket of the mounting apparatus cut away.
Figure 8:
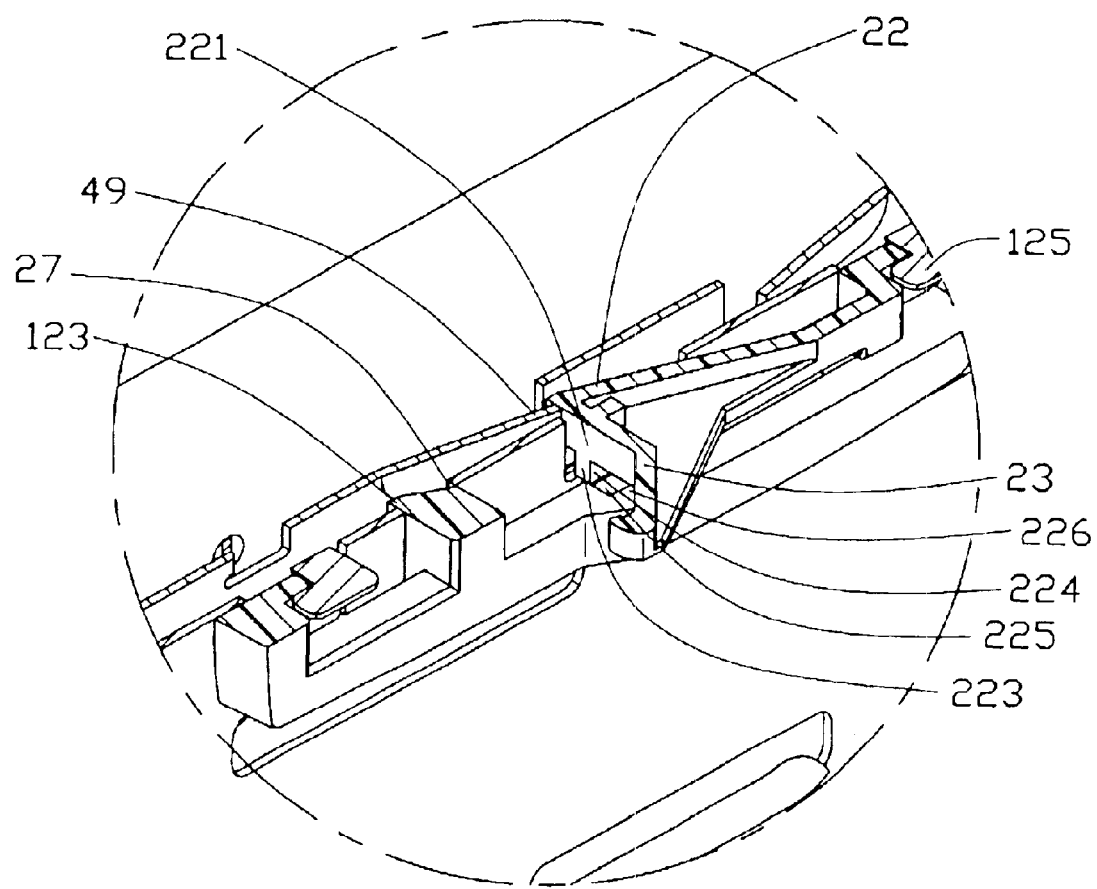
FIG. 8 is an enlarged view of a circled portion VIII of FIG. 7.

Referring to FIG. 4, each slide member 40 is elongate, and has a symmetrical configuration. The slide member 40 comprises an elongate main body, and a pair of opposite longitudinal flanges 42 extending outwardly from the main body. Each flange 42 comprises a pair of slanted guide portions 44, 44' at opposite ends thereof respectively. The guide portions 44', 44 of the flanges 42 enable the slide member 40 to be easily slid into or out of the drive bracket 10 along the guide rails. An upper one of the flanges 42 further forms a pair of resilient arms 41 that protrude slightly above the flange 42. Free ends of the resilient arms 41 oppose the guide portions 44, 44' respectively. A pair of buffers 47, 47' is outwardly formed at opposite ends of the slide member 40 respectively, between the guide portions 44, 44' respectively. The buffer, 47' can abut the stop plate 124 of the lateral wall 12 of the drive bracket 10. A pair of pins 48 is stamped inwardly from the main body adjacent the buffers 47, 47' respectively. The pins 48 are for engaging in the locking holes 34 of a corresponding side wall 32 of the data storage device 30. A pair of generally arch-shaped protrusions 49, 49' is stamped outwardly from a center portion of the main body. The protrusion 49' can abut the first contact face 221 of the first wedge 22 of the operating body 20.

Referring to FIGS. 5–8, in assembly, the hooks 125 of the drive bracket 10 are fully engaged in the first and second slots 242, 211 of the operating body 20. Simultaneously, the second wedge 27 is firmly engaged in the second hole 123 of the drive bracket 10, and the first wedge 22 is loosely engaged in the first hole 126 of the drive bracket 10. The operating body 20 is thus securely attached to the drive bracket 10. The first wedge 22 protrudes out through the first hole 126, ready for engagement with a corresponding slide member 40. The pair of slide members 40 are attached to the side walls 32 of the data storage device 30 by inserting the pins 48 into the corresponding locking holes 34. The combined data storage device 30 and slide members 40 is slid into the guide rails of the lateral walls 12, 14 of the drive bracket 10, being guided by the guide portions 44' of the slide members 40. In the course of sliding, the protrusion 49' of said corresponding slide member 40 rides over and deforms the resilient tongue 28 outwardly. When the protrusion 49' has completely passed over the first wedge 22 of the resilient tongue 28, the resilient tongue 28 rebounds to its original position. Simultaneously, said corresponding slide member 40 is stopped when the buffer, 47' thereof abuts against the stop plate 124 of the lateral wall 12. In this position, the protrusion 49' abuts the first contact face 221 of the first wedge 22. Thus, the combined data storage device 30 and slide members 40 is blocked from sliding back out of the drive bracket 10.

In disassembly, the handle 23 of the operating body 20 is pulled outwardly from the lateral wall 12 of the drive bracket 10. The resilient tongue 28 is deformed outwardly, with the first wedge 22 being moved outwardly. The protrusion 49' is no longer blocked by the first contact face 221. The second contact faces 224 of the stop blocks 223 prevent the resilient tongue 28 from being deformed too far, by abutting the main outer board 226. From this position, the combined data storage device 30 and slide members 40 is easily slid out of the drive bracket 10.

In the mounting apparatus of the present invention, the procedures of assembly and disassembly can be conveniently performed without the need for any tools such as screwdrivers.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A mounting apparatus adapted to mount a data storage device in a computer enclosure, the mounting apparatus comprising:
   a drive bracket adapted to be supported in the computer enclosure, the drive bracket comprising a lateral wall defining a first hole, a stop being inwardly formed at the lateral wall;
   an operating body attached to the lateral wall of the drive bracket, the operating body comprising a resilient portion, the resilient portion comprising a first wedge extending inwardly therefrom, the first wedge engaging in the first hole of the lateral wall; and
   a slide member adapted to be attached to the data storage device and slid into the drive bracket, the slide member comprising a protrusion abutting the first wedge of the operating body to prevent the slide member from moving in a first direction, and a buffer abutting the stop of the lateral wall of the drive bracket to prevent the slide member from moving in a second direction that is opposite to the first direction.

2. The mounting apparatus as claimed in claim 1, wherein the lateral wall of the drive bracket further defines a second hole adjacent the first hole, the operating body further comprises a second wedge engaging in the second hole.

3. The mounting apparatus as claimed in claim 2, wherein a pair of hooks is outwardly formed from the lateral wall of the drive bracket at opposite sides of the first and second holes respectively.

4. The mounting apparatus as claimed in claim 3, wherein a pair of support tabs is inwardly formed from the lateral wall of the drive bracket above the hooks, and another pair of support tabs is inwardly formed from the lateral wall of the drive bracket below the hooks.

5. The mounting apparatus as claimed in claim 4, wherein the drive bracket further comprises another lateral wall, and two pairs of support tabs are inwardly formed from said another lateral wall.

6. The mounting apparatus as claimed in claim 3, wherein the operating body further comprises a main outer board, and a pair of opposite longitudinal side boards perpendicularly adjoining the main outer board.

7. The mounting apparatus as claimed in claim 6, wherein a handle is outwardly formed at a free end of the resilient portion of the operating body.

8. The mounting apparatus as claimed in claim 6, wherein the operating body further comprises a pair of first and second base boards interconnecting the side boards at opposite ends of the operating body.

9. The mounting apparatus as claimed in claim 8, wherein the operating body further defines an opening at one end and a recess at the other end corresponding to the first and second base board respectively.

10. The mounting apparatus as claimed in claim 9, wherein the first and second base boards each define a locking slot therein, the locking slots corresponding to the hooks of the lateral wall of the drive bracket.

11. The mounting apparatus as claimed in claim 10, wherein the first wedge of the operating body further comprises a pair of opposite lateral faces.

12. The mounting apparatus as claimed in claim 1, wherein a pair of stops extends perpendicularly from distal ends of the lateral faces respectively, each of the stops comprises a contact face generally opposing the main outer board of the operating body.

13. The mounting apparatus as claimed in claim 1, wherein the slide member further comprises a pair of opposite longitudinal flanges.

14. The mounting apparatus as claimed in claim 13, wherein each of the flanges comprises a pair of opposite slanted guide portions.

15. The mounting apparatus as claimed in claim 14, wherein one of the flanges further forms a pair of resilient arms protruding slightly from the flange.

16. The mounting apparatus as claimed in claim 15, wherein a pair of pins is inwardly formed from the slide member, for engaging in the data storage device.

17. A mounting apparatus adapted to mount a data storage device in a computer enclosure, the mounting apparatus comprising:

a drive bracket adapted to be supported in the computer enclosure, the drive bracket comprising two opposite lateral walls, one of the lateral walls defining a first hole, two pairs of support tabs being inwardly formed from each of the lateral walls, the support tabs cooperatively forming a guide rail for the data storage device, a stop being inwardly formed from the lateral wall;

an operating body secured to said one of the lateral walls of the drive bracket, the operating body comprising a resilient portion, the resilient portion comprising a wedge extending inwardly therefrom, the wedge engaging in the first hole; and a slide member adapted to be attached to the data storage device to slide into the drive bracket, the slide member having a generally symmetrical configuration and comprising a pair of opposite longitudinal flanges, each of the flanges comprising a pair of guide portions at opposite ends thereof respectively, the guide portions enabling the slide member to be readily slid into or out of the drive bracket along the guide rails of the drive bracket.

18. The mounting apparatus as claimed in claim 17, wherein the slide member further comprises a protrusion abutting the wedge of the operating body to prevent the slide member from moving in a first direction.

19. The mounting apparatus as claimed in claim 18, wherein the slide member further comprises a buffer abutting the stop of the lateral wall of the drive bracket to prevent the slide member from moving in a second direction opposite to the first direction.

20. A mounting apparatus assembly comprising:

a drive bracket defining a receiving space with at least one side wall;

an opening defining in said side wall;

an operating body attached unto an outer surface of the side wall, said operating body including a resilient portion with a locking section extending into the opening;

a data storage device receiving in the receiving space;

at least one slide member attached unto a lateral wall of the data storage device, said slide member defining a protrusion with a latching edge, around the opening, which the locking section of the operating body abuts against when the data storage device is fully installed in the receiving space.

21. The mounting apparatus assembly as claimed in claim 20, wherein said side wall further includes a hole and the operating body includes a protrusion received in said hole when the operating body is assembled to the bracket.

22. The mounting apparatus assembly as claimed in claim 20, where said side wall includes hooks to engage corresponding slots provided in the operating body, respectively.

* * * * *